(12) United States Patent
Thomas et al.

(10) Patent No.: US 7,171,361 B2
(45) Date of Patent: Jan. 30, 2007

(54) IDIOM HANDLING IN VOICE SERVICE SYSTEMS

(75) Inventors: Andrew Thomas, Atherton, CA (US);
Mariann Hickey, Bristol (GB);
Stephen John Hinde, Bristol (GB);
Guillaume Belrose, South Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 885 days.

(21) Appl. No.: 10/013,934

(22) Filed: Dec. 13, 2001

(65) Prior Publication Data

US 2002/0128845 A1   Sep. 12, 2002

(30) Foreign Application Priority Data

Dec. 13, 2000   (GB)  ................... 0030330.5

(51) Int. Cl.
*G10L 15/04* (2006.01)
*G10L 21/00* (2006.01)

(52) U.S. Cl. ............... 704/251; 704/270.1; 704/275

(58) Field of Classification Search ............ None
See application file for complete search history.

(56) References Cited

U.S. PATENT DOCUMENTS

| | | | |
|---|---|---|---|
| 5,475,586 A * | 12/1995 | Sata et al. | |
| 5,477,450 A * | 12/1995 | Takeda et al. | 704/2 |
| 5,842,159 A * | 11/1998 | Nakamura et al. | 704/4 |
| 5,915,001 A * | 6/1999 | Uppaluru | 379/88.22 |
| 6,269,336 B1 * | 7/2001 | Ladd et al. | 704/270 |
| 6,415,257 B1 * | 7/2002 | Junqua et al. | 704/275 |
| 6,570,964 B1 * | 5/2003 | Murveit et al. | 379/67.1 |
| 2004/0199375 A1 * | 10/2004 | Ehsani et al. | 704/4 |

FOREIGN PATENT DOCUMENTS

| | | |
|---|---|---|
| EP | 1 079 615 A2 | 2/2001 |
| GB | 2 323 694 A | 9/1998 |

(Continued)

OTHER PUBLICATIONS

W3C; "Introduction and Overview of W3C Speech Interface Framework"; Aug. 11, 2000; http://www.w3g.org/Voice/Group/2000/voice-intro-20000911.html.

(Continued)

*Primary Examiner*—David Hudspeth
*Assistant Examiner*—Matthew J Sked

(57) ABSTRACT

The grammar of the speech input to a voice service system is normally specified by the voice service system. However, this can produce problems in respect of idioms, such as dates, which are expressed different ways by different users. To facilitate the handling of idioms, a user is permitted to specify their own idiom grammar which is then used by the voice service system to interpret idioms in speech input from that user. Typically, the normal grammar of speech input is specified by grammar tags used to mark up a voice page script interpreted by a voice page browser; in this case, it will generally be the voice browser that is responsible for employing the user-specified idiom grammar to interpret the corresponding idiom in the speech input by the user. The user-specified grammar can be pre-specified directly to the voice browser by the user or fetched by the browser from a remote location on the fly.

21 Claims, 3 Drawing Sheets

FOREIGN PATENT DOCUMENTS

WO       WO 99/57714       11/1999

OTHER PUBLICATIONS

"Voice Extensible Markup Language: VoicexMl" Mar. 7, 2000; Voice XML Forum.

Cosky et al., "Talking to Machines Today and Tomorrow: Designing for the User," *A &T Technical Journal*, Mar. 1, 1995, pp. 81-90, vol. 74, No. 2.

Pargellis et al., "Automatic Applicationi Generator Matches User Expectations to System Capabilities," *ESCA Tutorial and Research Workshop: Interactive Dialogue in Multi-Modal Systems*, Jun. 22-25, 1995, 4 pp., KLoster Irsee, Germany.

* cited by examiner

IDIOM HANDLING IN VOICE SERVICE SYSTEMS

RELATED APPLICATIONS

The present application is based on, and claims priority from, British Application Serial Number 0030330.5, filed Dec. 13, 2000, the disclosure of which is hereby incorporated by reference herein in its entirety.

FIELD OF THE INVENTION

The present invention relates to how idioms are handled by voice service systems; in the present specification, the term "idiom" is used to mean commonly occurring speech blocks, such as dates, that are set out in different ways by different users.

BACKGROUND OF THE INVENTION

In recent years there has been an explosion in the number of services available over the World Wide Web on the public internet (generally referred to as the "web"), the web being composed of a myriad of pages linked together by hyperlinks and delivered by servers on request using the HTTP protocol. Each page comprises content marked up with tags to enable the receiving application (typically a GUI browser) to render the page content in the manner intended by the page author; the markup language used for standard web pages is HTML (HyperText Markup Language).

However, today far more people have access to a telephone than have access to a computer with an Internet connection. Sales of cellphones are outstripping PC sales so that many people have already or soon will have a phone within reach where ever they go. As a result, there is increasing interest in being able to access web-based services from phones. 'Voice Browsers' offer the promise of allowing everyone to access web-based services from any phone, making it practical to access the Web any time and any where, whether at home, on the move, or at work.

Voice browsers allow people to access the Web using speech synthesis, pre-recorded audio, and speech recognition. FIG. 1 of the accompanying drawings illustrates the general role played by a voice browser. As can be seen, a voice browser is interposed between a user 2 and a voice page server 4. This server 4 holds voice service pages (text pages) that are marked-up with tags of a voice-related markup language (or languages). When a page is requested by the user 2, it is interpreted at a top level (dialog level) by a dialog manager 7 of the voice browser 3 and output intended for the user is passed in text form to a Text-To-Speech (TTS) converter 6 which provides appropriate voice output to the user. User voice input is converted to text by speech recognition module 5 of the voice browser 3 and the dialog manager 7 determines what action is to be taken according to the received input and the directions in the original page. The voice input/output interface can be supplemented by keypads and small displays.

In general terms, therefore, a voice browser can be considered as a largely software device which interprets a voice markup language and generate a dialog with voice output, and possibly other output modalities, and/or voice input, and possibly other modalities (this definition derives from a working draft, dated September 2000, of the Voice browser Working Group of the World Wide Web Consortium).

Voice browsers may also be used together with graphical displays, keyboards, and pointing devices (e.g. a mouse) in order to produce a rich "multimodal voice browser". Voice interfaces and the keyboard, pointing device and display maybe used as alternate interfaces to the same service or could be seen as being used together to give a rich interface using all these modes combined.

Some examples of devices that allow multimodal interactions could be multimedia PC, or a communication appliance incorporating a display, keyboard, microphone and speaker/headset, an in car Voice Browser might have display and speech interfaces that could work together, or a Kiosk.

Some services may use all the modes together to provide an enhanced user experience, for example, a user could touch a street map displayed on a touch sensitive display and say "Tell me how I get here?". Some services might offer alternate interfaces allowing the user flexibility when doing different activities. For example while driving speech could be used to access services, but a passenger might used the keyboard.

FIG. 2 of the accompanying drawings shows in greater detail the components of an example voice browser for handling voice pages 15 marked up with tags related to four different voice markup languages, namely:

tags of a dialog markup language that serves to specify voice dialog behaviour;

tags of a multimodal markup language that extends the dialog markup language to support other input modes (keyboard, mouse, etc.) and output modes (large and small screens);

tags of a speech grammar markup language that serve to specify the grammar of user input; and tags of a speech synthesis markup language that serve to specify voice characteristics, types of sentences, word emphasis, etc.

When a page 15 is loaded into the voice browser, dialog manager 7 determines from the dialog tags and multimodal tags what actions are to be taken (the dialog manager being programmed to understand both the dialog and multimodal languages 19). These actions may include auxiliary functions 18 (available at any time during page processing) accessible through APIs and including such things as database lookups, user identity and validation, telephone call control etc. When speech output to the user is called for, the semantics of the output is passed, with any associated speech synthesis tags, to output channel 12 where a language generator 23 produces the final text to be rendered into speech by text-to-speech converter 6 and output to speaker 17. In the simplest case, the text to be rendered into speech is fully specified in the voice page 15 and the language generator 23 is not required for generating the final output text; however, in more complex cases, only semantic elements are passed, embedded in tags of a natural language semantics markup language (not depicted in FIG. 2) that is understood by the language generator. The TTS converter 6 takes account of the speech synthesis tags when effecting text to speech conversion for which purpose it is cognisant of the speech synthesis markup language 25.

User voice input is received by microphone 16 and supplied to an input channel of the voice browser. Speech recogniser 5 generates text which is fed to a language understanding module 21 to produce semantics of the input for passing to the dialog manager 7. The speech recogniser 5 and language understanding module 21 work according to specific lexicon and grammar markup language 22 and, of course, take account of any grammar tags related to the current input that appear in page 15. The semantic output to the dialog manager 7 may simply be a permitted input word or may be more complex and include embedded tags of a natural language semantics markup language. The dialog manager 7 determines what action to take next (including, for example, fetching another page) based on the received user input and the dialog tags in the current page 15.

Any multimodal tags in the voice page 15 are used to control and interpret multimodal input/output. Such input/output is enabled by an appropriate recogniser 27 in the input channel 11 and an appropriate output constructor 28 in the output channel 12.

Whatever its precise form, the voice browser can be located at any point between the user and the voice page server. FIGS. 3 to 5 illustrate three possibilities in the case where the voice browser functionality is kept all together; many other possibilities exist when the functional components of the voice browser are separated and located in different logical/physical locations.

In FIG. 3, the voice browser 3 is depicted as incorporated into an end-user system 8 (such as a PC or mobile entity) associated with user 2. In this case, the voice page server 4 is connected to the voice browser 3 by any suitable data-capable bearer service extending across one or more networks 9 that serve to provide connectivity between server 4 and end-user system 8. The data-capable bearer service is only required to carry text-based pages and therefore does not require a high bandwidth.

FIG. 4 shows the voice browser 3 as co-located with the voice page server 4. In this case, voice input/output is passed across a voice network 9 between the end-user system 8 and the voice browser 3 at the voice page server site. The fact that the voice service is embodied as voice pages interpreted by a voice browser is not apparent to the user or network and the service could be implemented in other ways without the user or network being aware.

In FIG. 5, the voice browser 3 is located in the network infrastructure between the end-user system 8 and the voice page server 4, voice input and output passing between the end-user system and voice browser over one network leg, and voice-page text data passing between the voice page server 4 and voice browser 3 over another network leg. This arrangement has certain advantages; in particular, by locating expensive resources (speech recognition, TTS converter) in the network, they can be used for many different users with user profiles being used to customise the voice-browser service provided to each user.

As already noted with reference to the FIG. 2 voice browser, voice processing systems use speech grammars to recognize words the users speaks and to control the form in which a user may utter a particular sentence. For example, a grammar may limit a user to speaking a date as a number followed by a month followed by a two digit year. There are several readily identifiable "idioms" used in human/computer interfaces such as dates, credit card numbers etc. These idioms are, in effect, common building blocks.

Current voice systems provide recognition of idioms by attempting to recognize all the ways in which the majority of users might say a particular idiom. This leads to a very complex grammar for what is conceptually a very simple task. It is normal for speech recognition systems to use some form of probability model derived from the grammar to make decisions about how the speech will be recognized. The more complex the grammar, the more difficult it is for the recognizer to determine which sentential form the utterance has come from.

It is an object of the present invention to provide a method and apparatus for facilitating the recognition of idioms input by a user in their preferred way of speaking.

SUMMARY OF THE INVENTION

According to one aspect of the present invention, there is provided a method of handling idioms in speech input by a user to a voice service system, the grammar of the speech input being normally specified by the voice service system; said method involving using a user-specified idiom grammar to interpret the corresponding idiom in speech input from that user.

Typically, the normal grammar of speech input is specified by grammar tags used to mark up a voice page script interpreted by a voice page browser; in this case, it will generally be the voice browser that is responsible for employing the user-specified idiom grammar to interpret the corresponding idiom in the speech input by the user.

The user-specified grammar can be pre-specified directly to the voice browser by the user or fetched by the browser from a remote location on the fly.

The present invention also encompasses apparatus for implementing the foregoing method.

BRIEF DESCRIPTION OF THE DRAWINGS

A method and apparatus embodying the invention will now be described, by way of non-limiting example, with reference to the accompanying diagrammatic drawings, in which.

BEST MODE OF CARRYING OUT THE INVENTION

In the following description, voice services are described based on voice page servers serving pages with embedded voice markup tags to voice browsers. Unless otherwise indicated, the foregoing description of voice browsers, and their possible locations and access methods is to be taken as applying also to the described embodiments of the invention. Furthermore, although voice-browser based forms of voice services are preferred, the present invention in its widest conception, is not limited to these forms of voice service system and other suitable systems will be apparent to persons skilled in the art.

Figure 1:
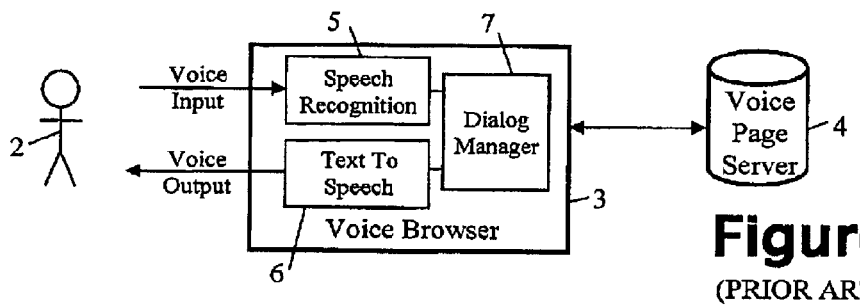
FIG. 1 is a diagram illustrating the role of a voice browser.
Figure 3:
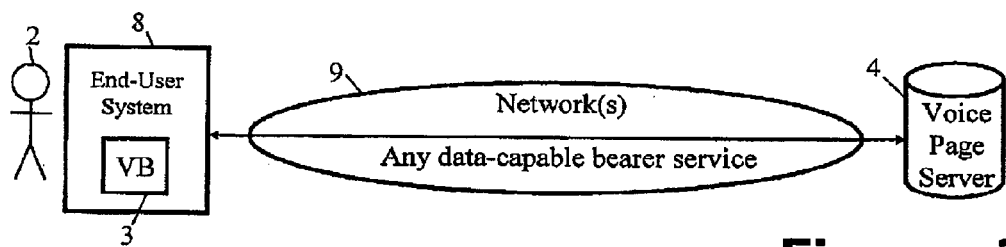
FIG. 3 is a diagram showing a voice service implemented with voice browser functionality located in an end-user system.
Figure 4:
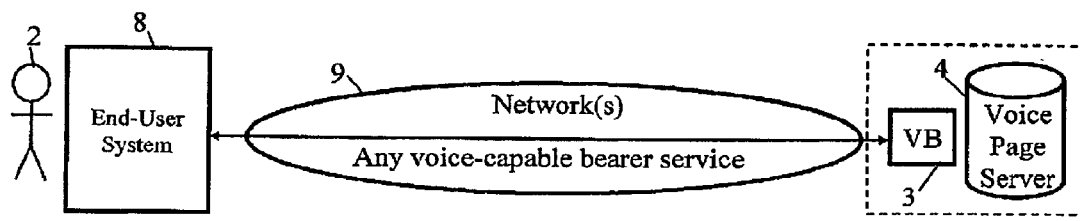
FIG. 4 is a diagram showing a voice service implemented with voice browser functionality co-located with a voice page server.
Figure 5:
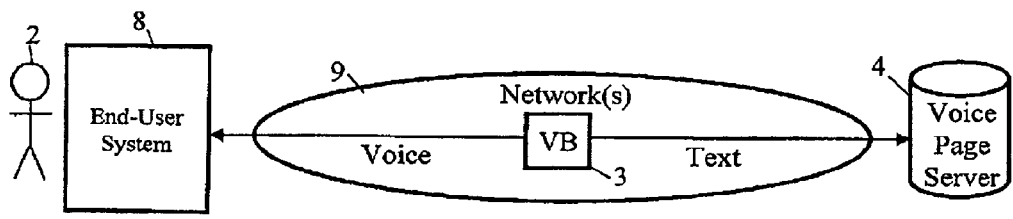
FIG. 5 is a diagram showing a voice service implemented with voice browser functionality located in a network between the end-user system and voice page server.
Figure 2:
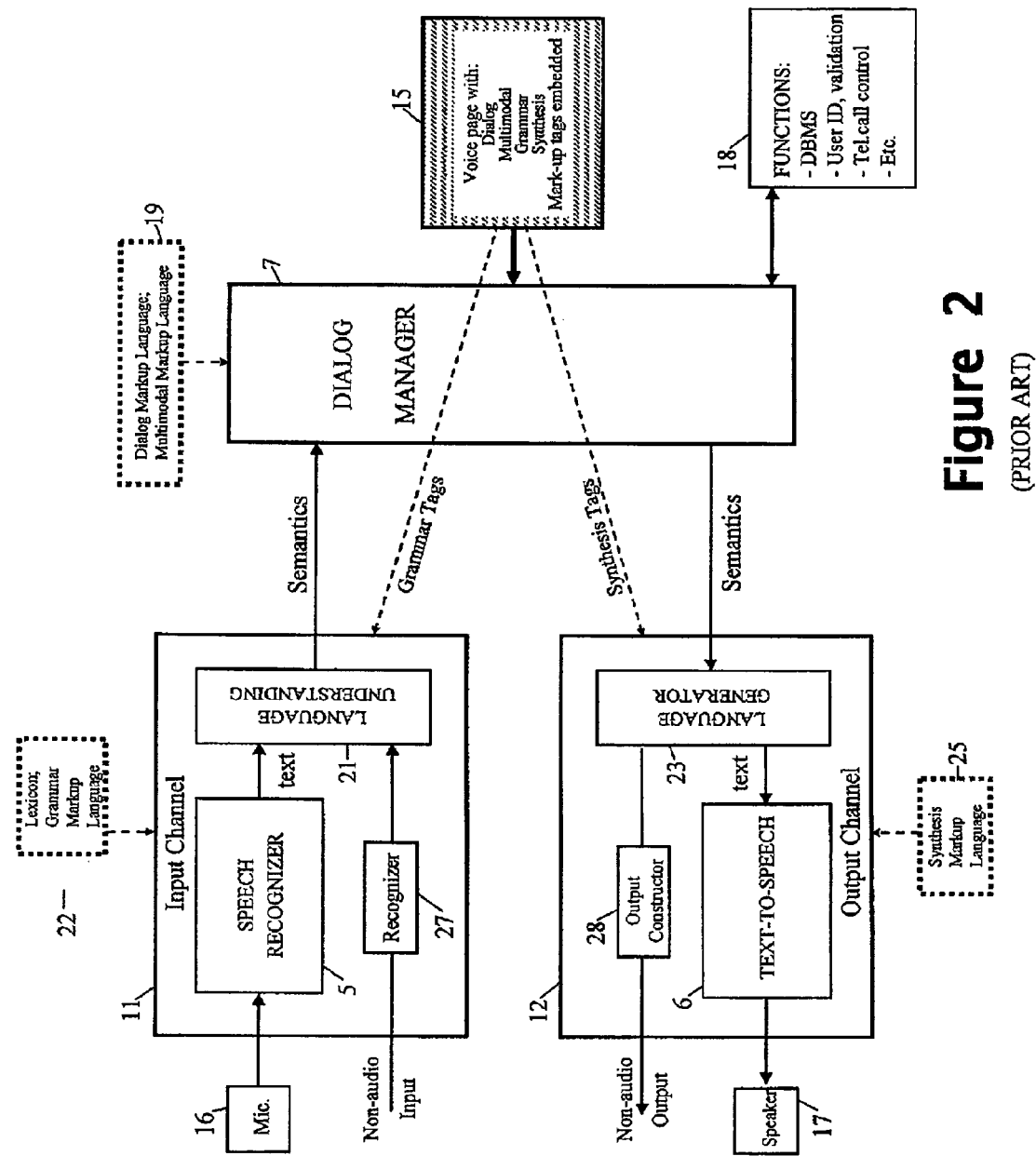
FIG. 2 is a diagram showing the functional elements of a voice browser and their relationship to different types of voice markup tags.
Figure 6:
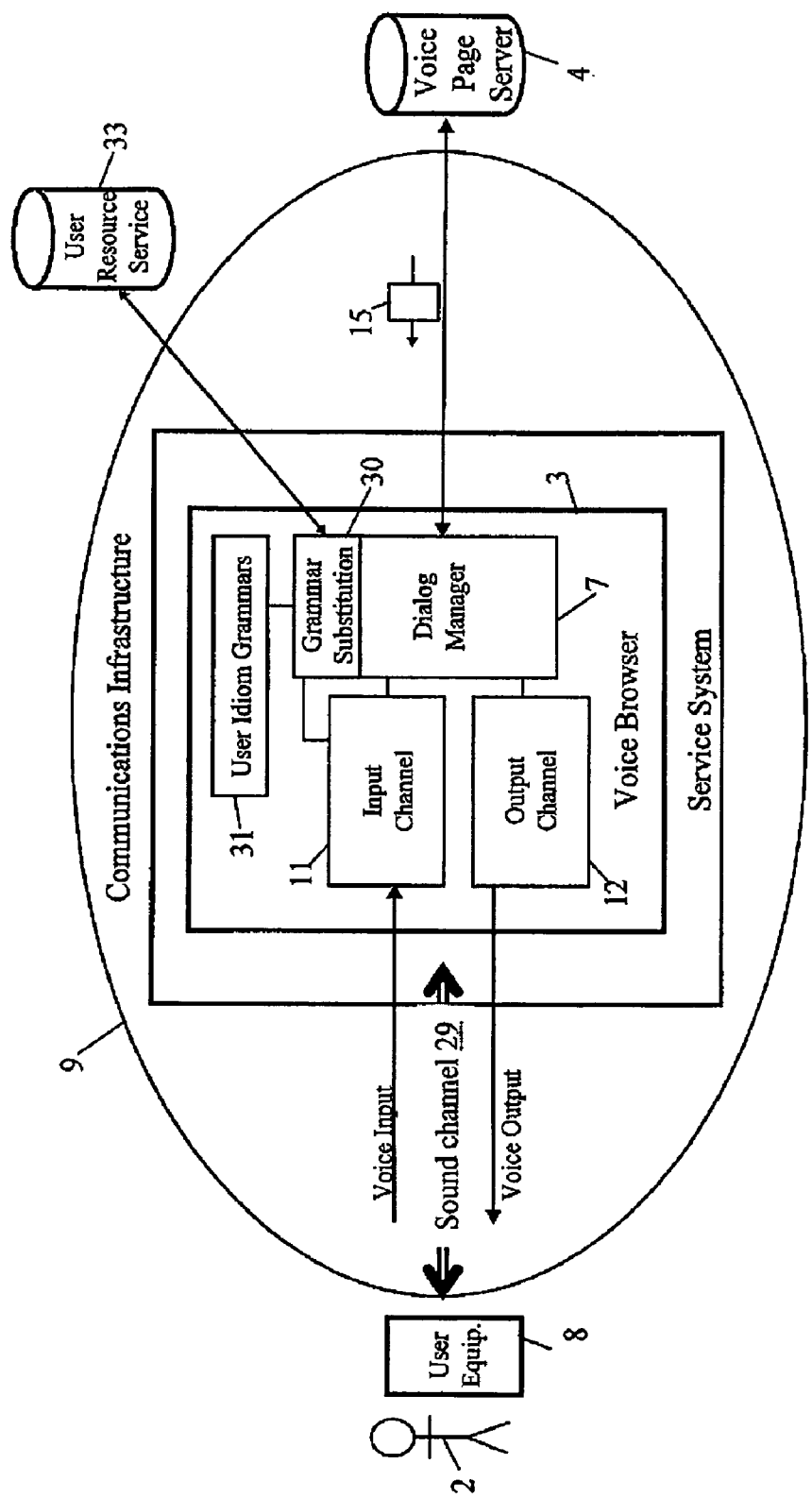
FIG. 6 is a diagram illustrating an embodiment of the present invention implemented in a network-based voice browser.

FIG. 6 shows a voice browser 3, similar in form to that of FIG. 2, which is located at a service system within communications infrastructure 9 and is being used by user 2 to browse a voice site hosted by voice page server 4. The user is connected via user equipment 8 and voice channel 29 to the voice browser. Server 4 serves voice pages 15 to the browser and receives back user input in text form.

Voice browser 3 includes a grammar substitution block 30 the role of which is to cause the user's preferred idiom grammar to be used by the input channel 11 of the browser in interpreting the user's voice input of the idiom. The user's preferred grammar for one or more idioms is pre-specified by the user, this specified grammar (or a reference to it) being stored in store 31. When a voice page is served that contains an idiom, the page may explicitly state that the browser should use a built-in grammar for the idiom; in this case, the block 30 retrieves the user's preferred grammar for the idiom concerned and supplies it to the input channel 11 for interpreting the user's input. The input channel will then generally provide a name-value pair for feedback to the voice site on server 4. If the user has failed to specify a preferred idiom grammar, then the browser will use a default idiom grammar (which could be specified by the voice page 15).

The grammar substitution block 30 can also act to override whatever grammar is specified by voice page 15 even if the latter does not explicitly provide for this. In this case, the block must actively look for idioms in the page 15 and then substitute the user's preferred grammar. If the voice site expects the user's input back as name-value pairs, then the block 30 need take no further action; however, if the voice site expects feedback in the form of an ordered string of values with the order being set by the grammar specified in the page, then block 30 must ensure that the output obtained from input channel 11 using the user's preferred grammar, is correctly ordered for provision back to the voice site.

The voice browser 3 need not permanently hold the user's preferred idiom grammars in store 31 and can be arranged to load these grammars from a remote site, such as site 33, only when the user logs on to the voice browser service system. This remote site could, for example, be a "home" voice browser service system of the user, the address of this home service system being supplied to the current voice browser at log on to enable the latter to fetch the idiom grammars from site 33. Alternatively, the user can supply their preferred idiom grammars from user equipment 8 to the voice browser 3 at log on.

A further possibility is for the user's preferred grammar for a particular idiom to be fetched from a remote site, such as site 33, as and when needed for a particular voice page 15, that is, on the fly. If it transpires that the user has not specified a grammar for a particular idiom, then either the user's remote resource site 33 can be made responsible for supplying a default grammar, or this can be supplied by the voice browser (or be specified in the page 15).

By allowing a user to use their own personal grammar for idioms in the foregoing manner, the user can say a particular idiom in a way with which he/she feels most comfortable without compromising the efficiency of the voice recognition system.

Two examples will now be given of a flight-booking system voice page, written using VoiceXML (c.f. Voice XML Forum), where the user can select his/her departure date. VoiceXML scripts accept 3 kinds of grammars, namely: inline grammars (written in the script itself), external grammars (referred to by a URL), and built-in grammars; the present example concern the second and third kinds of grammar.

EXAMPLE 1

Using Built-In Grammars

```
<!xml version=1.0"!>
<vxml version="1.0">
<form id="flightBooking">
<block> Welcome to the booking system.</block>
<field name="travelDate">
<grammar src="builtin:grammar/date/">
<prompt> When do you want to leave! </prompt>
</field>
</form>
</vxml>
```

The <grammar> element tells the browser 3 to use a built-in grammar to handle spoken date information. The user has pre-configured the browser by specifying pointers to the built-in grammars he prefers to use. So instead of loading the default built-in grammars, the browser fetches grammars specific to the user.

Such a grammar could look like:
JSGF V1.0 ISO8859-1 en;
grammar bulltin.grammar.date;
import <com.sun.speech.app.month>;
import <com.sun.speech.app.day>;
import <com.sun.speech.app.year>;
public <date>=<month><day><year>;

('JSGF' refers to the Java Speech Grammar Format)

EXAMPLE 2

Using External Grammars

A user of a voice browser resource service (such as provided by server 33) can be given a unique identifier which, for example, is made up of:

a voice browser service identifier (example: "www-.myvoicebrowser.com")

a user ID (example: johnDoe).

All the grammars used by "www.myvoicebrowser.com" users are stored under www.myvoicebrowser/grammars.

The "myvoicebrowser.com" resource can also store other user preferences as language, dialect, gender, etc.

A VoiceXML script 15 can then explicitly specify, for example, the fetching on the fly of a grammar corresponding to a particular user of a voice browser using servlet-like requests.

```
<!xml version=1.0"!>
<vxml version="1.0">
<form id="flightBooking">
<block> Welcome to the booking system.</block>
<field name="travelDate">
<grammar expr=" 'http://' + session.vbid + '/grammar!type=date&id=session.uid'">
<prompt> When do you want to leave ! </prompt>
</field>
</form>
</vxml>
``` where:
session.vbid—is a session variable holding the voice browser identifier.
Session.uid—is a session variable holding the user ID.

The grammar tag contains an expression which when it is interpreted indicates the URL of the grammar to load. For instance:

http://www.myvoicebrowser.com/
grammar?type=date&id=johnDoe"

If the user's grammar is not found at the site www.myvoicebrowser.com, then this site could redirect to a default grammar located on a well-known web site, for example:

www.grammar.com/?type=date

Many variants are, of course, possible to the arrangements described above. For example, since the user may still input an idiom in a format that does not correspond to that of their preferred grammar, the voice browser can be arranged to remind the user of what format to use, either before input or following an uninterpretable input of the idiom.

The invention claimed is:

1. A method of handling idioms in speech input by a user to a voice service system, the method comprising:
normally interpreting the speech input using a first grammar;
in response to one of said idioms being encountered in the speech input, interpreting the idiom using, in place of the first grammar, an idiom grammar that is distinct from the first grammar and pre-specified by the user.

2. A method according to claim 1, wherein the voice service provided by the voice service system is effected by the serving of voice pages in the form of text with embedded voice markup tags, including grammar tags, to a voice browser; the voice browser interpreting these pages and carrying out speech recognition of user voice input, text to speech conversion to generate voice output, and dialog management; the voice browser being disposed between a voice page server and the user, and the voice browser retrieving and using said user-specified idiom grammar.

3. A method according to claim 2, wherein the voice browser permanently stores said user-specified idiom grammar and uses it whenever a voice page permits use of a built-in grammar for the idiom concerned.

4. A method according to claim 2, wherein the voice browser fetches said user-specified idiom grammar from a remote location as and when a voice page permits use of a user grammar for the idiom concerned.

5. A method according to claim 2, wherein the voice browser fetches said user-specified idiom grammar from a remote location upon user logon to the browser, the voice browser using the fetched idiom grammar whenever a voice page permits use of a built-in or user grammar for the idiom concerned.

6. A method according to claim 2, wherein the voice browser substitutes said user-specified grammar for a grammar specified in a voice page for that idiom independently of whether the voice page explicitly permits such substitution.

7. A method according to claim 1, wherein said idiom is a date.

8. A voice browser arranged to be responsive to normal speech and idioms encountered in speech input from a user of the browser, the browser comprising: a voice-server interface for interfacing with a voice page server to provide user input to the server and to receive voice pages from the server in the form of text with embedded voice markup tags including grammar tags; an input channel, including a speech recogniser, for normally interpreting user voice input using a first grammar; a dialog manager for effecting dialog control on the basis of output from the input channel and voice pages received from the voice page server; and an output channel, including a text-to-speech converter, for generating voice output from the received voice pages under the control of the dialog manager; the voice browser being arranged to respond to one of said idioms being encountered by using in place of the first grammar, an idiom grammar that is distinct from the first grammar and pre-specified by the user.

9. A voice browser according to claim 8, wherein the voice browser includes a data store for permanently storing said idiom grammar.

10. A voice browser according to claim 9, wherein the voice browser includes means for determining whether a served voice page including said idiom permits use of a grammar for that idiom different from any specified in the page itself, the voice browser being operative to cause the input channel to use the stored idiom grammar only in response to permission by the voice page concerned.

11. A voice browser according to claim 8, wherein the voice browser includes means for fetching said idiom grammar from a remote location, the voice browser being operative to fetch that idiom grammar for use by the input channel in response to a voice page including the idiom being served to the browser for said user.

12. A voice browser according to claim 8, wherein the voice browser includes: means for said idiom grammar from a remote location, and means for determining whether a served voice page including said idiom permits use of a grammar for that idiom different from any specified in the page itself, the voice browser being operative to fetch said idiom grammar for use by the input channel only in response to a served voice page including the idiom permitting use of a grammar for that idiom different from any specified in the page itself.

13. A voice browser according to claim 8, wherein the voice browser includes means arranged to be responsive to said user connecting to the browser, for fetching said idiom grammar from a remote location and temporarily store it.

14. A voice browser according to claim 13, wherein the voice browser includes means for determining whether a served voice page including said idiom permits use of a grammar for that idiom different from any specified in the page itself, the voice browser being operative to cause the input channel to use the temporarily-stored idiom grammar only in response to permission by the voice page concerned.

15. A voice browser according to claim 8, wherein the voice browser is operative to substitute said idiom grammar for a grammar specified in a voice page for that idiom independently of whether the voice page explicitly permits such substitution.

16. A voice browser according to claim 8, wherein said idiom is a date.

17. A voice browser according to claim 9, wherein the voice browser is arranged for determining whether a served voice page including said idiom permits use of a grammar for that idiom different from any specified in the page itself, the voice browser being operative to cause the input channel to use the stored idiom grammar only in response to permission by the voice page concerned.

18. A voice browser according to claim 8, wherein the voice browser is arranged for fetching said idiom grammar from a remote location, the voice browser being operative to fetch that idiom grammar for use by the input channel in response to a voice page including the idiom being served to the browser for said user.

19. A voice browser according to claim 8, wherein the voice browser is arranged for (a) fetching said user-specified grammar from a remote location, and (b) determining whether a served voice page including said idiom permits use of a grammar for that idiom different from any specified in the page itself, the voice browser being operative to fetch said idiom grammar for use by the input channel only in response to a served voice page including the idiom permitting use of a grammar for that idiom different from any specified in the page itself.

20. A voice browser according to claim 8, wherein the voice browser is arranged to be responsive to said user connecting to the browser for fetching said idiom grammar from a remote location and temporarily storing it.

21. A voice browser according to claim 20, wherein the voice browser is arranged for determining whether a served voice page including said idiom permits use of a grammar for that idiom different from any specified in the page itself, the voice browser being operative to cause the input channel to use the temporarily-stored idiom grammar only in response to permission by the voice page concerned.

* * * * *